United States Patent [19]
Andrick et al.

[11] Patent Number: 5,687,976
[45] Date of Patent: Nov. 18, 1997

[54] SYMMETRICAL GASKET FOR A PIPE JOINT

[75] Inventors: William C. Andrick, Uniontown; Salvatore R. Brugnano, Munroe Falls, both of Ohio

[73] Assignee: Vertex, Inc., Mogadore, Ohio

[21] Appl. No.: 644,342

[22] Filed: May 10, 1996

[51] Int. Cl.$^6$ ................................................ F16J 15/10
[52] U.S. Cl. ..................... 277/207 A; 277/207 R; 277/215; 277/214; 277/201
[58] Field of Search ............... 277/207 A, 207 R, 277/215, 214, 201

[56] References Cited

U.S. PATENT DOCUMENTS

| | | | |
|---|---|---|---|
| 2,471,759 | 5/1949 | Lowrey | 277/206 |
| 3,219,354 | 11/1965 | Kazienko | 277/168 |
| 3,288,475 | 11/1966 | Benoit | 277/206 R |
| 3,317,214 | 5/1967 | Durgom | 277/170 |
| 3,550,990 | 12/1970 | Rentschler | 277/206 |
| 3,592,481 | 7/1971 | Jeffery et al. | 277/207 |
| 3,647,229 | 3/1972 | Grimes | 277/207 |
| 3,690,684 | 9/1972 | Lansaque et al. | 277/207 |
| 3,712,631 | 1/1973 | Forchini et al. | 277/207 |
| 3,776,682 | 12/1973 | Parmann | 425/384 |
| 3,843,302 | 10/1974 | Petzetakis | 425/388 |
| 4,304,415 | 12/1981 | Wolf et al. | 277/207 A |
| 4,346,922 | 8/1982 | Ohtsuga et al. | 285/109 |
| 4,368,894 | 1/1983 | Parmann | 277/166 |
| 4,508,355 | 4/1985 | Ditcher | 277/207 A |
| 4,529,211 | 7/1985 | Rodgers | 277/163 |
| 4,602,792 | 7/1986 | Andrick | 277/207 A |
| 4,602,793 | 7/1986 | Andrick | 277/207 A |
| 5,114,162 | 5/1992 | Ditcher | 277/207 A |
| 5,169,161 | 12/1992 | Jones | 277/207 A |
| 5,380,017 | 1/1995 | Leeuwenburg et al. | 277/207 A |

*Primary Examiner*—William A. Cuchlinski, Jr.
*Assistant Examiner*—Christina Annick
*Attorney, Agent, or Firm*—Fay, Sharpe, Beall, Fagan, Minnich & McKee

[57] ABSTRACT

A pipe joint includes an outer pipe and an inner pipe inserted into the outer pipe. One of the outer pipe and the inner pipe includes an annular groove and a gasket is positioned in the groove to provide a seal between the outer pipe and the inner pipe. The gasket includes an annular gasket body formed of a resilient material with the gasket body having a centerline. A projection extends radially away from the gasket body. The projection is so located on the gasket body that it is bisected by the centerline thereof. An annular bore extends in the gasket body. The bore is spaced from the projection and is so located in the gasket body that it is bisected by the centerline thereof. The gasket is symmetrical around an axial centerline and is therefore insensitive to axial orientation. It is meant for sealing an annular space in a bell and spigot pipe joint and is capable of sealing against both internal and external pressures and internal and external vacuums.

23 Claims, 7 Drawing Sheets

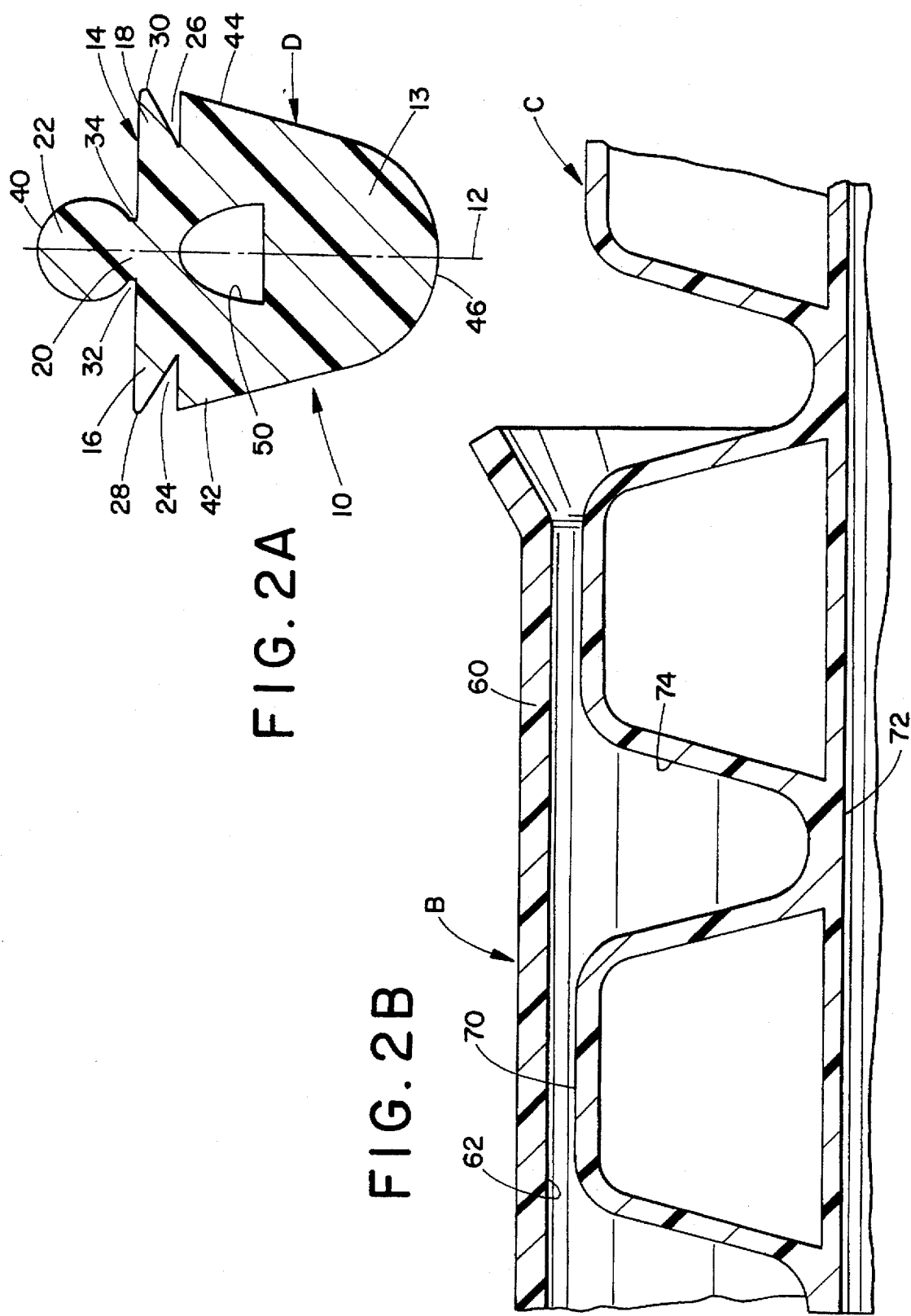

SYMMETRICAL GASKET FOR A PIPE JOINT

BACKGROUND OF THE INVENTION

The present invention relates generally to flexible fluid-type seals for pipe joints. More particularly, the instant invention relates to a gasket adapted for sealing bell and spigot type pipe joints.

The gasket disclosed herein is particularly adapted for use in the field of sewer pipe assemblies. However, it should be appreciated that the gasket design disclosed could be adapted for use in many other types of pipe joints as well.

Sewer pipe assemblies are generally made of plastic, polyethylene, metal, concrete or other suitable materials. These are fabricated in many configurations and sizes to meet specific requirements and users' preferences. In many such pipe assemblies, grooves are formed or recesses are provided in ribbed or corrugated types of pipe. Although a spigot—or male groove—is the dominant method employed for manufacturing sewer pipes, it is also possible that a formed groove in the bell—or female pipe—can be utilized.

Some gaskets are integrally installed at the factory during fabrication of the sewer pipes while others are simply applied at the jobsite. For very large diameter concrete pipes, such as in storm and sanitary sewer systems, field installation of the gaskets is generally considered necessary.

Historically, piping systems have utilized polymeric gasket elements to provide resilient seals under various operating conditions. These include no internal pressure, no external pressure, working internal pressure, high external pressure or any combination of these. In each case, the gasket must maintain its ability to seal when quick changes occur in the pressures imposed on the gasket.

O-ring type gaskets have frequently been employed on large diameter pipe joints. The O-ring is typically mounted on the spigot and the spigot is then pushed into the bell causing the O-ring to roll further onto the spigot until it reaches roughly the center of the pipe connection. Dirty or uneven surfaces, poor or improperly applied lubricants, misaligned pipes and excessive force may cause the O-ring to distort non-uniformly, resulting in a weak seal, or even in a void through which fluids can flow. Some spigots include a circumferential groove or a single or a double offset shoulder to keep the O-ring from rolling as the pipes are interconnected. However, the diameter of the O-ring and its radial cross-section are usually greater than the depth of the groove or shoulder and the ring may still roll over the inside edge of the groove, become snagged or shear off segments of the O-ring as the spigot enters the bell.

Various gasket configurations have been used or suggested for overcoming these deficiencies. In order to provide self-alignment of the gasket, various gasket profiles have been developed. In each of these, however, it is essential that the gasket be placed on the spigot in a desired orientation. That is, the gasket functions properly only when it is installed in a particular direction and cannot function if installed in a reverse or backwards manner. This has made it necessary for identification marks to be placed on the surface of the gasket for the purpose of distinguishing the front, or functional side, of the gasket profile from the back, or non-functional side. These stripes, printing or color coding identifiers then become critical to the success or failure of the sealing system.

There are symmetrical gaskets known for pipe joints. However, these gaskets do not provide a projection and an annular bore which are both bisected by an axial centerline of the gasket. Such gaskets do not provide a tight seal in both high and low pressure conditions, both internally and externally of the pipe joint. Sealing rings are known for sealing against fluid flow in both high and low pressure conditions in either direction. However, these sealing rings are not symmetrical and, therefore, can be installed incorrectly so that they will not seal properly.

Accordingly, it has been considered desirable to develop a new and improved gasket and pipe joint design which would overcome the foregoing difficulties and others while providing better and more advantageous overall results.

BRIEF SUMMARY OF THE INVENTION

According to the present invention, a pipe joint which can accommodate both internal and external pressures and vacuums is provided.

More particularly in accordance with this aspect of the invention, the pipe joint comprises an outer pipe and an inner pipe inserted into the outer pipe wherein one of the outer pipe and the inner pipe comprises an annular groove. A gasket is positioned within the annular groove and is adapted to provide a seal between the outer pipe and the inner pipe. The gasket comprises an annular gasket body formed of a resilient material with the gasket body having a centerline. A projection extends radially away from the gasket body. The projection is so located on the gasket body that it is bisected by the centerline thereof. An annular bore extends in the gasket body, the bore being spaced from the projection being so located on the gasket body that it is bisected by the centerline thereof.

Preferably, the gasket further comprises a first recess formed in the gasket body adjacent the projection. The first recess being located on a first side of the centerline and the second recess formed in the gasket body adjacent the projection and being located on a second side of the centerline. The gasket body can further comprise a first compression point located on an outer periphery of the gasket body and a first side of the centerline in a spaced manner from the first recess and a second compression point located on the outer periphery of the gasket body and the second side of the centerline in a spaced manner from the second recess. The gasket body can further comprise a third compression point located on the periphery of the gasket body in a spaced manner from the projection wherein the third compression point is bisected by the centerline.

If desired, the gasket can further comprise a first lip located on an outer periphery of the gasket body and positioned on the first side of the centerline and second lip located on the outer periphery of the gasket body and positioned on a second side of the centerline. The pipe joint can further comprise a second annular bore extending in the gasket body, the second bore being spaced from the first bore and from the projection and being so located on the gasket body that it is also bisected by the centerline thereof.

The gasket can further comprise a first recess formed in the gasket body, the first recess being located on a first side of the centerline and a second recess formed in the gasket body with the second recess being located on a second side of the centerline. If desired, a third lip and a fourth lip can be located on the outer periphery of the gasket body, the third lip being located on a first side of the centerline in a spaced manner from the first lip and the second lip being located on the second side of the centerline in a spaced manner from the second lip.

One advantage of the present invention is the provision of a new and improved gasket for a pipe joint.

Another advantage of the present invention is the provision of a gasket which is particularly suitable for mounting in storm or sanitary sewer pipes that have a bell and spigot type joint.

Still another advantage of the present invention is the provision of a gasket which is insensitive to axial orientation so that it can be installed in either axial orientation in a pipe joint.

A further advantage of the present invention is the provision of a gasket which is capable of maintaining a seal in non or low pressure environments, i.e. in compression, as well as in pressurized environments, i.e. under hydraulic induced pressures.

A still further advantage of the present invention is the provision of a gasket which is provided with a series of functional sealing points. No less than four contact points effect sealing by a compression action when the pipe assembly is joined together.

A yet further advantage of the present invention is the provision of a gasket having a set of self-energizing, hydraulic seal points which increase in sealing efficiency upon an increase in internal pressure. Preferably, four such seal points are provided around the periphery of the gasket.

Still other benefits and advantages of the invention will become apparent to those skilled in the art upon a reading and understanding of the following detailed specification.

BRIEF DESCRIPTION OF THE DRAWINGS

The invention may take form in certain structures and parts, several preferred embodiments of which will be described in detail in this specification and illustrated in the accompanying drawings, wherein:

FIG. 2A is an enlarged cross-sectional view of the gasket of FIG. 1;

FIG. 2B is a reduced cross-sectional view of the pipes in the pipe joint of FIG. 1;

DETAILED DESCRIPTION OF THE SEVERAL EMBODIMENTS

Figure 1:
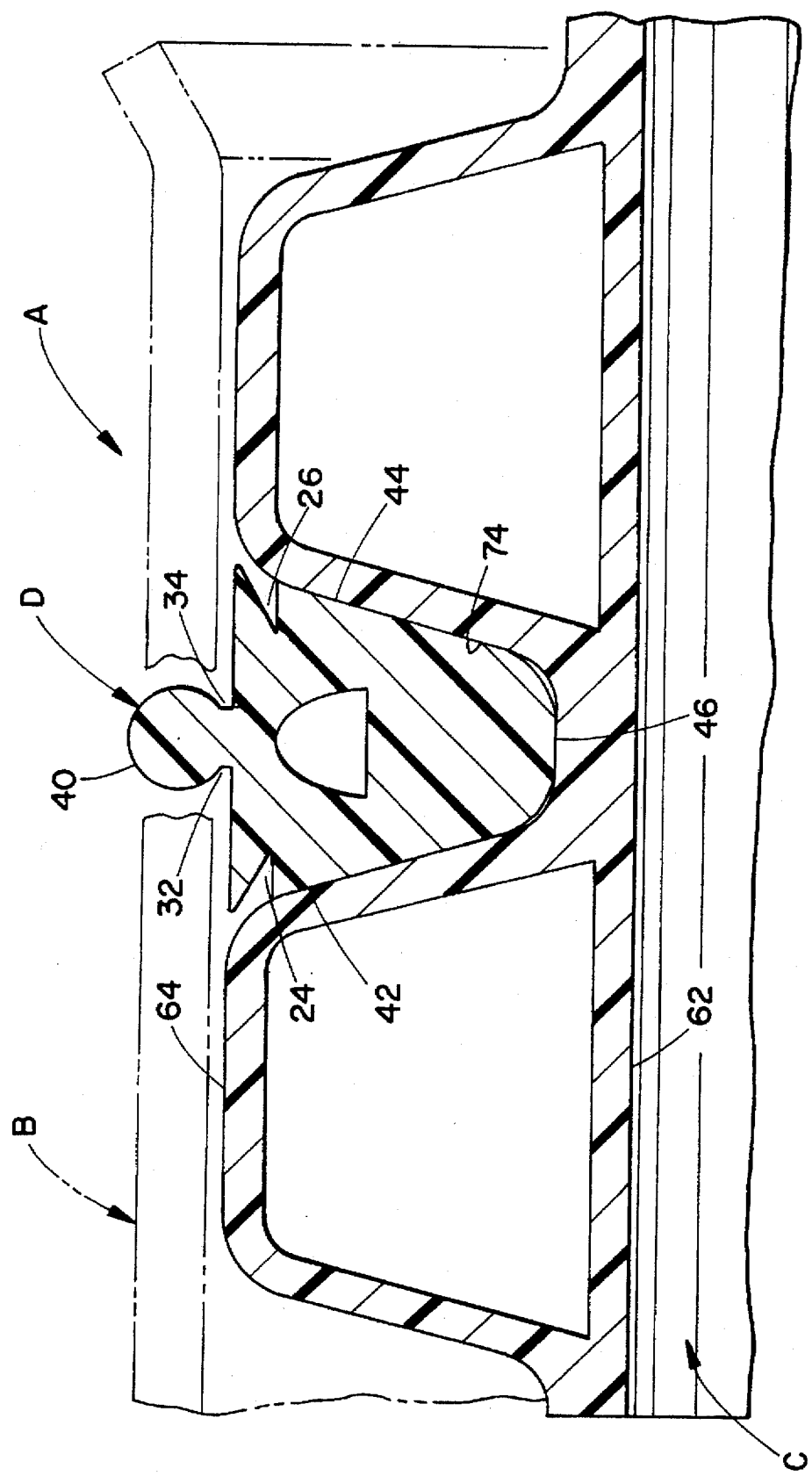
FIG. 1 is a cross-sectional view of a gasket and a pipe joint according to a first preferred embodiment of the present invention.

Referring now to the drawings, wherein the showings are for purposes of illustrating several preferred embodiments of the invention only and not for purposes of limiting same, FIG. 1 shows a pipe joint A including a first pipe B, a second pipe C and a gasket D meant for sealing between the two pipes. While the pipe joint is illustrated to be of the bell and spigot type which is generally used in sewer pipe assemblies, it should be appreciated by those of average skill in the art that the gasket illustrated herein could be used in other types of sealing environments as well.

With reference now to FIG. 2A, the gasket D comprises an annular gasket body or web 10 which has an axial centerline 12. The gasket body includes a base 13 and a protrusion 14 which extends away therefrom. The protrusion comprises a first wing 16 and a second wing 18 as well as a stem 20 that leads to a rib 22. It is apparent from FIG. 2A that the first and second wings are symmetrical about the centerline 12 such that the first wing 16 is located on one side of the centerline and the second wing 18 is located on the other side of the centerline. It is also apparent that the stem 20 and rib 22 are bisected by the centerline.

Defined between the protrusion 14 and the base 13 on a first side of the centerline 12 is a first recess 24. Defined on a second side of the centerline 12 between the protrusion 14 and the base 18 is a second recess 26. A first lip 28 is located at the apex of the first wing 16 and a second lip 30 is located at the apex of the second wing 18. Defined between the first wing 16 and the rib 22 on a first side of the stem 20 is a third recess 32. Similarly defined on the second side of the centerline 12 between the second wing 18 and the rib 22 on the second side of the stem 20 is a fourth recess 34.

A series of compression points are located on the gasket body 10. These comprise a first compression point 40 located at the apex of the rib 22, a second compression point 42 located on one side of the base 13, a third compression point 44 located on the other side of the base 13 and a fourth compression point 46 located at the lowest point or nadir of the base 13. It is noted that the first and fourth compression points are each bisected by the centerline 12 and that the second and third compression points are located on opposite sides of the centerline.

Extending through the base 13 is an aperture 50. It should be appreciated that the aperture 50 is bisected by the axial centerline 12 of the gasket body 10. In this embodiment, the aperture is illustrated to be in the shape of half an ellipse. The aperture is toroidal in shape just as is the gasket body 10 itself. The gasket body 10 is manufactured from a suitable conventional elastomeric material in a conventional manner such as by extrusion. The two ends of the gasket body are then secured together to form a toroidal shape as is well known in the art.

With reference now to FIG. 2B, the gasket is meant to be used between the first pipe B and the second pipe C. The first pipe, or outer pipe, includes a bell 60 having an internal wall surface 62. The second pipe or inner pipe includes an external wall surface 70 and an internal wall surface 72 between which is defined a groove 74. The gasket D is meant to be placed in the groove 74, as is illustrated in FIG. 1. Once so located, even in an uncompressed state, the second, third and fourth compression points 42, 44 and 46 are in contact with the respective wall surfaces of the inner or second pipe C that defined the U-shaped groove 74.

Figure 2C:
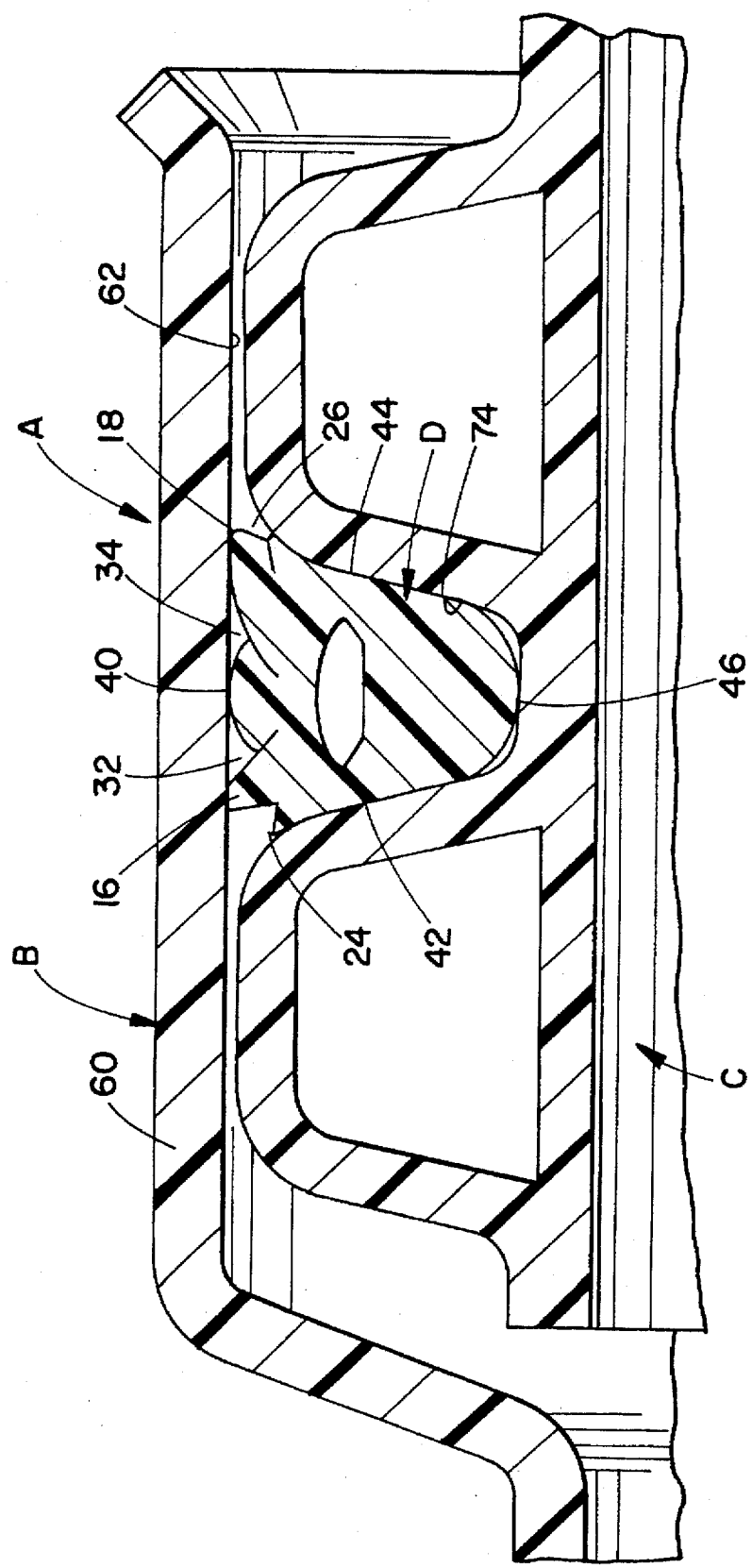
FIG. 2C is a cross-sectional view of the gasket and pipe joint of FIGS. 2A and 2B when assembled and illustrating the gasket in a compressed and pressurized condition.

With reference now to FIG. 2C, a compressed condition of the gasket D is shown. A sealing contact is established between the first compression point 40 and the inner surface 62 of the outer pipe. Also, a sealing contact is established between the second, third and fourth compression points 42, 44 and 46 and the respective walls of the groove 74 in the inner or second pipe C. In addition, the first recess 24, the third recess 32, the fourth recess 34 and the second recess 26 enable the establishment of hydraulic seals between the first and second pipes B and C as fluid pressures are exerted on the gasket.

The incorporation of multiple hydraulic and compression areas on the gasket D allows for sealing capabilities in both a non-pressure environment or a low pressure environment—while the gasket is in compression—as well as in a pressurized condition, i.e. when the pressure on the gasket is hydraulically induced. Hydraulic and compression areas in the gasket are necessary due to the increasing use of lower operating pressure sewer pipe lines. The primary function of the gasket is low pressure sealing. However, when pressure fluctuations occur and a higher internal pressure puts higher demands on the gasket, the gasket must be able to react in an acceptable and efficient manner and maintain a reliable seal under changing conditions. In addition, when a sewer line operating at low internal pressure is evacuated of effluents, it creates a reverse pressure vacuum. This can allow a situation of equal unwanted circumstances whereby infiltration of fluids and/or solids can put potentially destructive burdens on the total sewage handling system at a vulnerable location.

The provision of four compression points provides sealing by a compression action when the pipe assembly is joined together. Likewise, upon activation of the pipe line, the set of four recesses provides four self-energizing hydraulic sealing points which have increasing sealing efficiency when exposed to increasing sealing pressures. All of the foregoing is achieved in a gasket design which is not dependent on direction, i.e. the gasket is symmetrical and the web is formed to fit in grooves in either axial direction.

Figure 3:
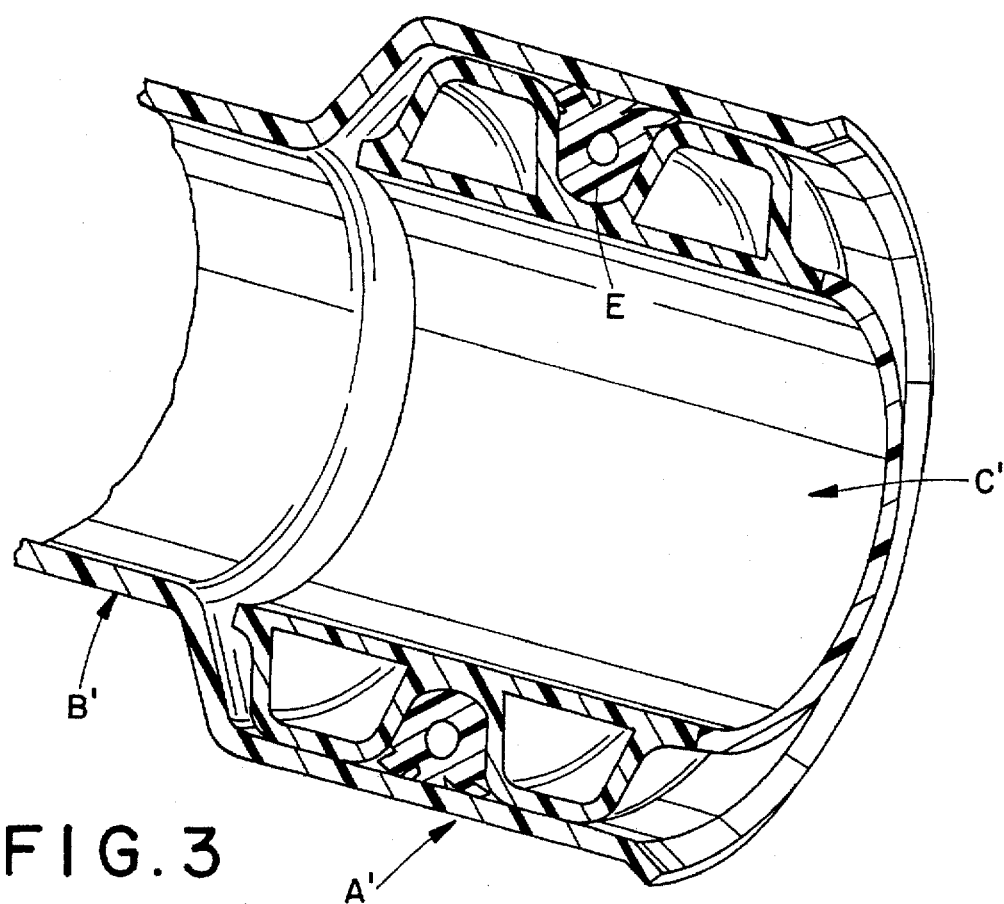
FIG. 3 is a perspective view in cross-section of an assembled pipe joint employing a gasket according to a second preferred embodiment of the present invention.

With reference now to FIG. 3, another type of gasket design is therein illustrated. For ease of comprehension and appreciation of this embodiment, like components will be identified by like numerals with a primed suffix (') and new components will be identified by new numerals.

Figure 4:
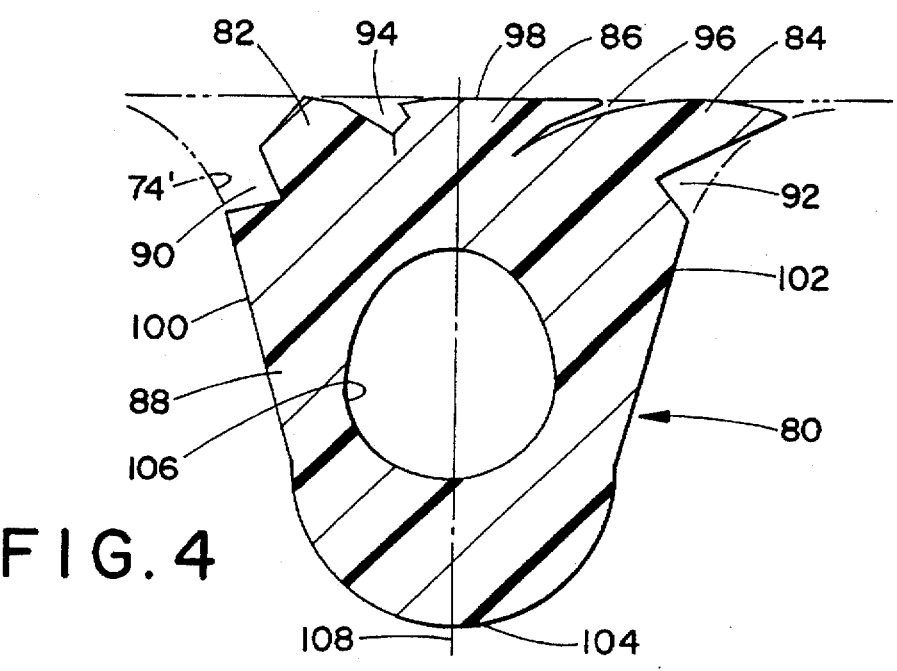
FIG. 4 is an enlarged cross-sectional view of the gasket of FIG. 3 in a compressed and pressurized condition.

In this embodiment, a gasket E is employed in a pipe joint A' between a first pipe B' and a second pipe C'. With reference now also to FIG. 4, the gasket E comprises a gasket body 80 having a protrusion comprising a first wing 82, a second wing 84 and a rib 86 extending therefrom. Defined between the protrusion and a base 88 of the gasket body 80, is a first recess 90 and a second recess 92. Defined between the first wing 82 and the rib 86 is a third recess 94 and defined between the rib 86 and the second wing 84 is a fourth recess 96. Located at the apex of the rib 86 is a first compression point 98. Located on the two sides of the gasket body 80 are second and third compression points 100 and 102. Opposite the first compression point 98 is a fourth compression point 104. When the gasket E is installed in the groove 74 and the pipe joint is made, the four compression points will provide respective seals between the first and second pipes B' and C'. Hydraulic pressures can also provide hydraulic seals via the respective recesses 90-96. An aperture 106 extends through the gasket body 83. Unlike the half ellipse aperture 50 illustrated in FIG. 2A, the aperture 106 in FIG. 4 is shaped as a complete ellipse. An axial centerline 108 of the gasket body 80 bisects the aperture 106 as well as the first and fourth compression points 98, 104.

Figure 5A:
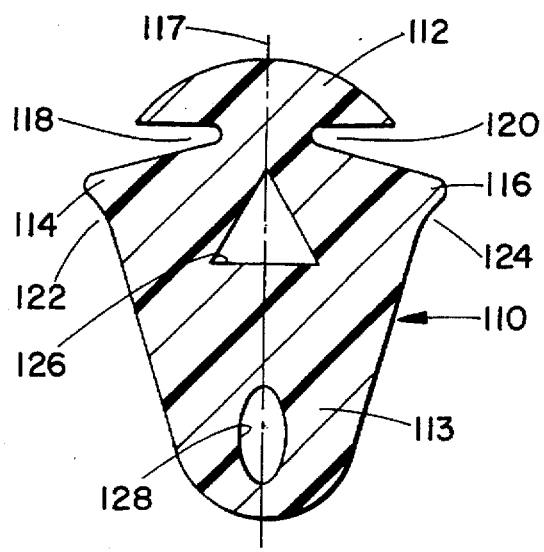
FIGS. 5A–5I are cross-sectional views through gaskets according to other preferred embodiments of the present invention.

With reference now to FIG. 5A, another type of gasket includes a gasket body 110 having a mushroom-shaped protrusion 112 extending from a base 113. Defined on the base are a first wing 114 and a second wing 116. These are located on opposite sides of an axial centerline 117 of the base. Defined between the base and the protrusion are respective recesses 118 and 120 on opposite sides of the centerline. Located below the first wing 114 is a third recess 122 and located below the second wing 116 is a fourth recess 124. A first toroidal aperture 126 extends through the gasket body 110. Spaced therefrom is a second toroidal aperture 128. It is apparent that the centerline 117 bisects the apertures 126 and 128. The first aperture 126 is triangular in cross-section whereas the second aperture 128 is ellipsoidal. This embodiment of the invention also provides four contact points to effect sealing by compressive action and four hydraulic seal points as defined by the four recesses 118-124.

Figure 5B:
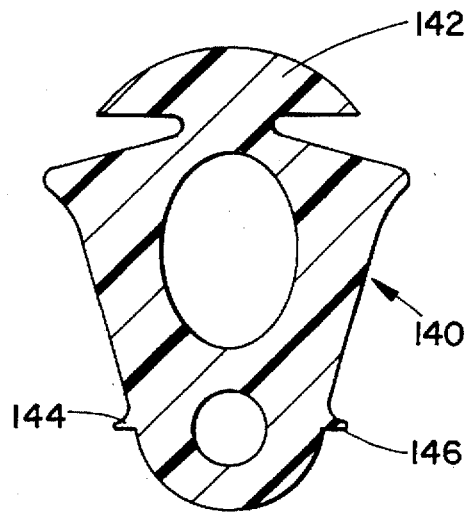

FIG. 5B illustrates another type of gasket body 140 which has a protrusion 142 as in the embodiment of FIG. 5A as well as a pair of toroidal apertures, one being ellipsoidal and the other being circular. This embodiment, however, also includes a pair of additional sealing lips 144 and 146 located on opposite sides of an axial centerline of the gasket body 140. Therefore, with this embodiment, six contact points are provided to effect sealing by a compressive action when the pipe assembly is joined together.

Figure 5C:
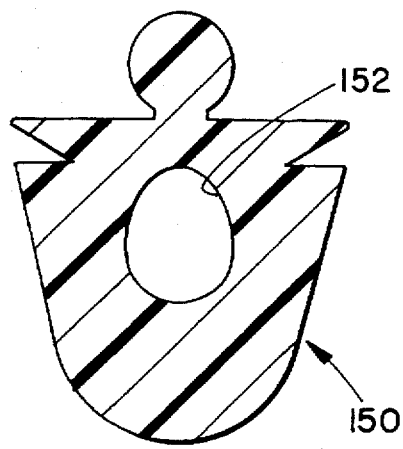

FIG. 5C illustrates a gasket body 150 in which a single egg-shaped toroidal aperture 152 is located.

Figure 5D:
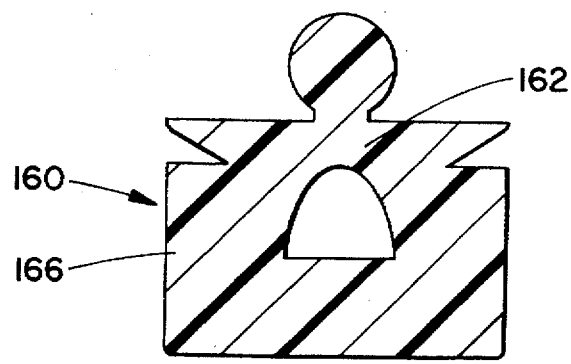

FIG. 5D illustrates a gasket body 160 with a protrusion 162 extending from a base 166 which is rectangular in nature. The rectangular base is in contrast to the substantially parabolic nature of the gasket body bases which have been illustrated thus far.

Figure 5E:
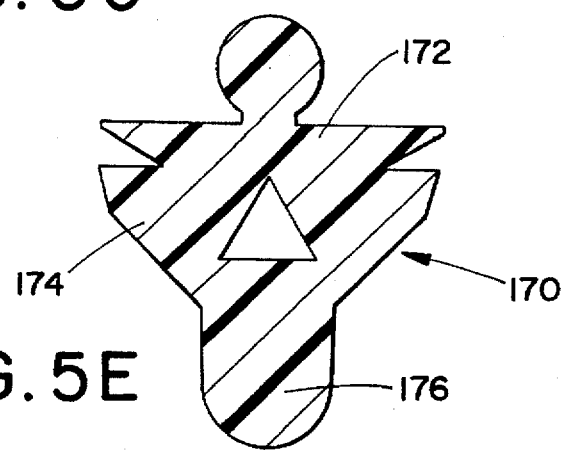

FIG. 5E illustrates yet another type of gasket body 170. In this embodiment, a protrusion 172 extends from a polygonal base 174 and from which a second, keel-shaped, protrusion 176 extends in a direction opposite from the first protrusion 172.

Figure 5F:
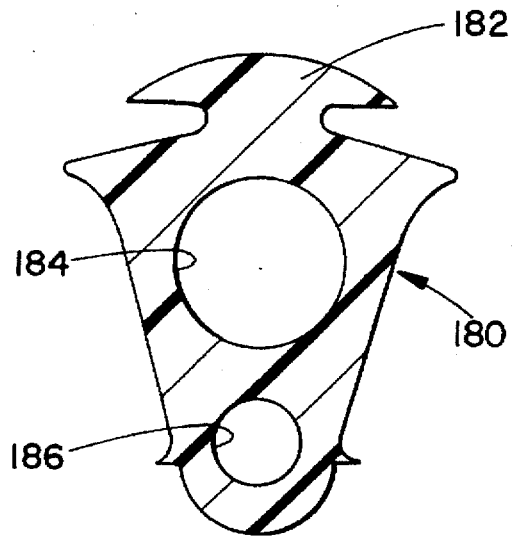

With reference now to FIG. 5F, a gasket body 180 has a mushroom-shaped protrusion 182 extending away therefrom, as well as a pair of circular cross-section, rather large sized, toroidal apertures 184 and 186. Such apertures are in contrast to the elliptical nature of the apertures illustrated in the embodiment of FIG. 5B.

Figure 5G:
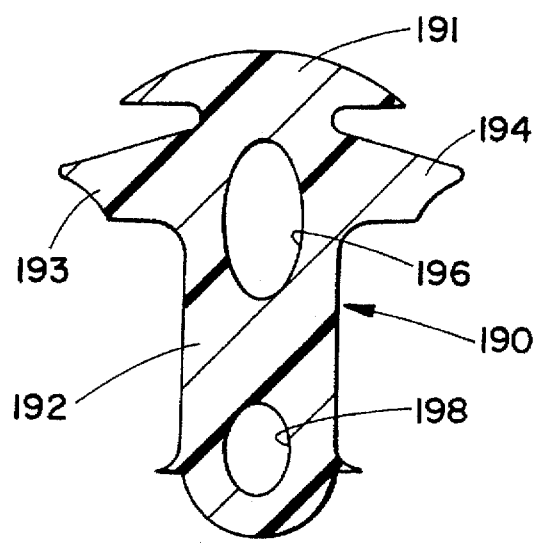

FIG. 5G illustrates yet another gasket body 190 having a protrusion 191 extending from a roughly rectangular elongated base 192. Extending from the base are a pair of wings 193 and 194 on opposite sides of an axial centerline of the gasket body. Located in the base 192 are a pair of elliptical spaced apertures 196 and 198 which are bisected by an axial centerline of the gasket body 190.

Figure 5H:
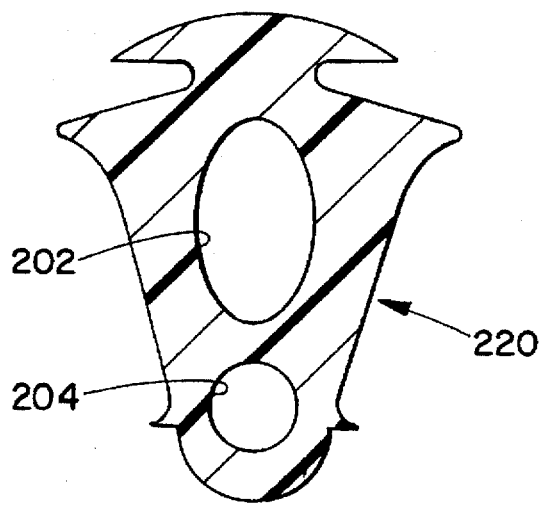

FIG. 5H illustrates yet another type of gasket body 200 incorporating an elliptical first aperture 202 and a circular second aperture 204.

Figure 5I:
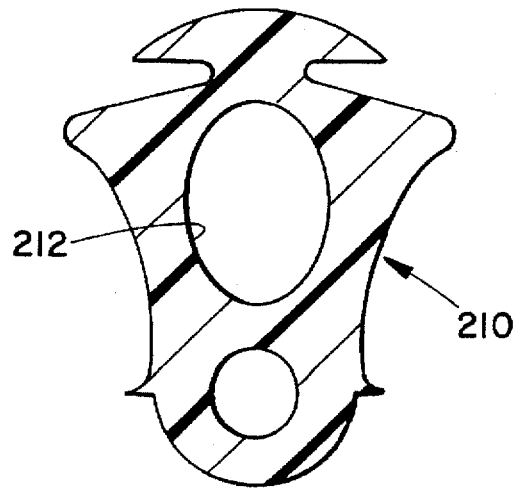

FIG. 5I illustrates a still further gasket body 210 also having an elliptical aperture 212 therein. The difference between the embodiments of FIG. 5H and 5I has to do with the exact shape of the bases of the respective gasket bodies 200 and 210. As can be seen, the base of the gasket body 210 is thicker than is the gasket body 200. Therefore, it can be used with a somewhat differently formed groove.

Figure 5J:
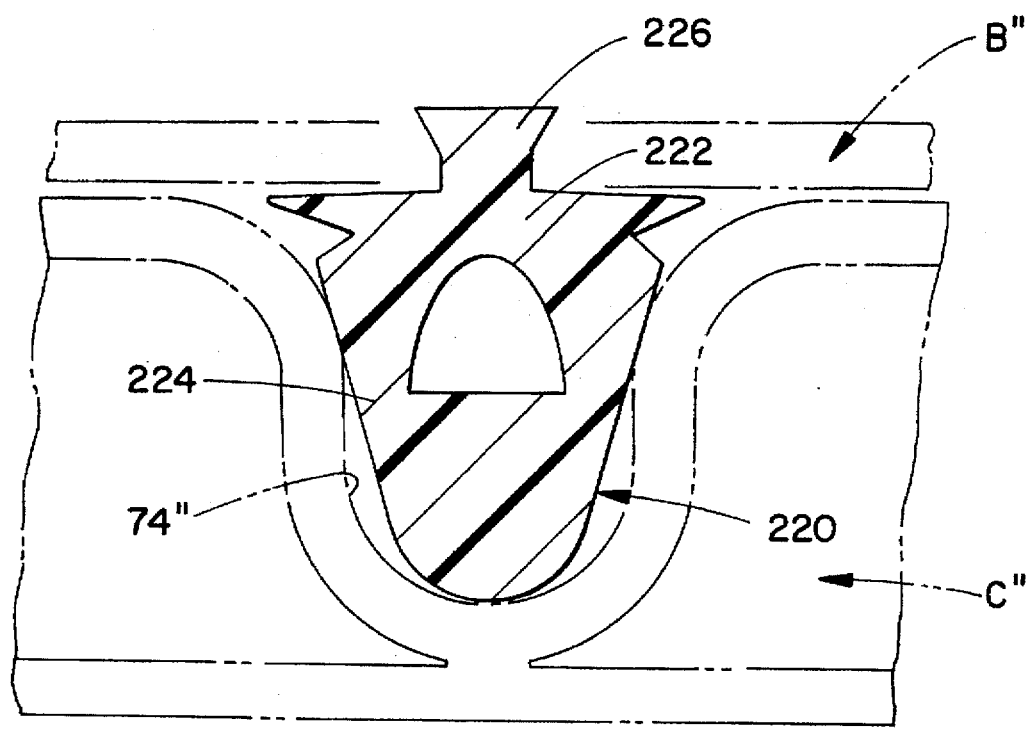
FIG. 5J is a cross-sectional view of a gasket in a pipe joint according to yet another preferred embodiment of the present invention; and, FIG. 6 is a cross-sectional view of a gasket in a pipe joint according to yet still another preferred embodiment of the present invention.

With reference now to FIG. 5J, another type of gasket body 220 is there illustrated. This gasket body comprises a protrusion 222 extending from a base 224. In this embodiment, the protrusion includes a rib 226 which, rather than being rounded—as in the embodiments of FIGS. 1, 2A and 5C–5E—or being mushroom-shaped—as in the embodiments of FIGS. 5A, 5B and 5F–5I—has a flattened upper surface. This contacts an outer pipe B" when the gasket body 220 is seated in a groove 74" of the inner pipe C".

Figure 6:
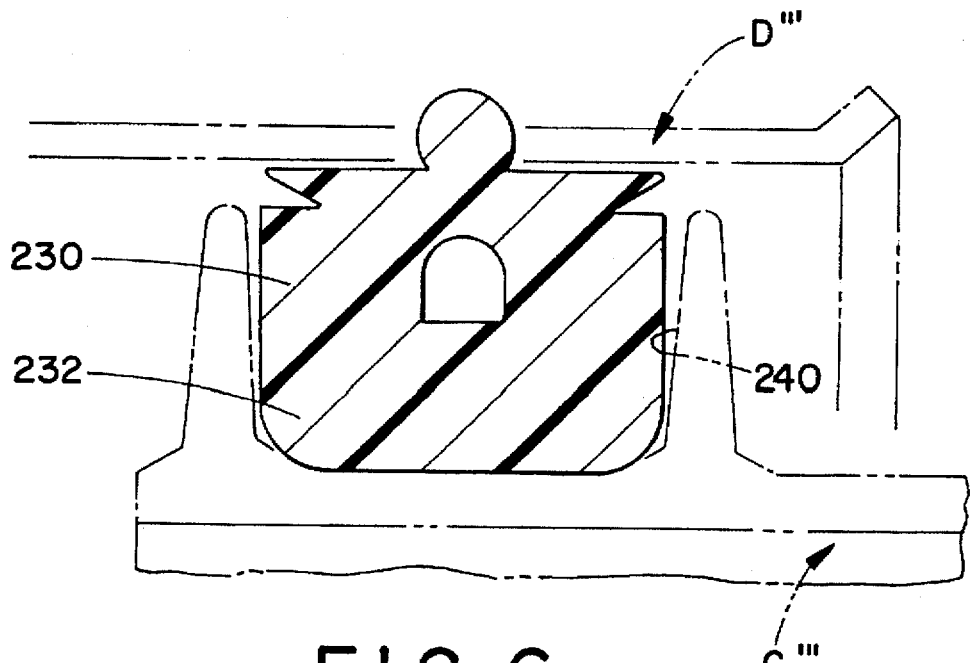

Finally, with reference to FIG. 6, a gasket body 230 includes a roughly rectangular base 232. A different type of inner pipe groove 240 is necessary to accommodate the base in an inner pipe C'". However, the same or a different type of outer pipe D'" can be employed.

The invention has been described with reference to several preferred embodiments. Obviously, modifications and alterations will occur to others upon the reading and understanding of this specification. It is intended to include all such modifications and alterations insofar as they come within the scope of the appended claims or the equivalents thereof.

I claim:

1. A pipe joint comprising:

an outer pipe;

an inner pipe inserted into said outer pipe, wherein one of said outer pipe and said inner pipe comprises an annular groove; and, a gasket positioned within said annular groove and adapted to provide a seal between said outer pipe and said inner pipe, said gasket comprising:

an annular gasket body formed of a resilient material, said gasket body having a centerline and including a base adapted to sealingly engage said groove, a projection extending radially from said gasket body, said projection being so located on said gasket body that it is bisected by said centerline thereof, and an annular bore extending in said gasket body, said bore being spaced from said projection and being so located in said gasket body that it is bisected by said centerline thereof.

2. The pipe joint of claim 1 wherein said gasket further comprises:

a first recess formed in said gasket body adjacent said projection, said first recess being located on a first side of said centerline; and, a second recess formed in said gasket body adjacent said projection, said second recess being located on a second side of said centerline.

3. The pipe joint of claim 2 wherein said gasket body further comprises:

a first compression point located on said protection and wherein said first compression point is bisected by said centerline.

4. The pipe joint of claim 3 wherein said gasket body further comprises:

a second compression point located on said periphery of said gasket body on said first side of said centerline in a spaced manner from said first recess; and a third compression point located on said outer periphery of said gasket body on said second side of said centerline in a spaced manner from said second recess.

5. The pipe joint of claim 1 wherein said gasket further comprises:

a first lip located on an outer periphery of said gasket body and positioned on a first side of said centerline; and, a second lip located on said outer periphery of said gasket body and positioned on a second side of said centerline.

6. The pipe joint of claim 5 wherein said gasket body further comprises a second annular bore extending in said gasket body, said second bore being spaced from said first bore and from said projection and being so located on said gasket body that it is bisected by said centerline thereof.

7. The pipe joint of claim 6 wherein said gasket further comprises:

a first recess formed in said gasket body, said first recess being located on a first side of said centerline; and, a second recess formed in said gasket body, said second recess being located on a second side of said centerline.

8. The pipe joint of claim 7 wherein said gasket body further comprises:

a third lip located on said outer periphery of said gasket body on said first side of said centerline in a spaced manner from said first lip; and, a fourth lip located on said outer periphery of said gasket body on said second side of said centerline in a spaced manner from said second lip.

9. A non-directional gasket which is insensitive to axial gasket orientation, comprising:

an annular gasket body formed of a resilient material, said gasket body having an axial centerline and a base adapted to sealingly engage an annular groove on a pipe;

a projection extending radially from said gasket body, said projection being so located on said gasket body that it is bisected by said centerline thereof; and, an annular bore located in said gasket body, said bore being spaced from said projection and being so positioned in said gasket body that it is bisected by said centerline thereof.

10. The gasket of claim 9 further comprising:

a first recess formed in said gasket body adjacent said projection, said first recess being located on a first side of said centerline; and, a second recess formed in said gasket body adjacent said projection, said second recess being located on a second side of said centerline.

11. The gasket of claim 10 further comprising:

a first compression point located on said protection and wherein said first compression point is bisected by said centerline.

12. The gasket of claim 11 further comprising:

a second compression point located on said periphery of said gasket body on said first side of said centerline in a spaced manner from said first recess; and a third compression point located on said outer periphery of said gasket body on said second side of said centerline in a spaced manner from said second recess.

13. The gasket of claim 9 further comprising:

a first lip located on an outer periphery of said gasket body and positioned on a first side of said centerline; and, a second lip located on said outer periphery of said gasket body and positioned on a second side of said centerline.

14. The gasket of claim 13 further comprising a second annular bore extending in said gasket body, said second bore being spaced from said first bore and from said projection and being so located on said gasket body that it is bisected by said centerline thereof.

15. The gasket of claim 13 further comprising:

a third lip located on an outer periphery of said gasket body on said first side of said centerline in a spaced manner from said first lip; and, a fourth lip located on said outer periphery of said gasket body on said second side of said centerline in a spaced manner from said second lip.

16. A gasket for sealing an annular space in a bell-and-spigot pipe joint, comprising:

an annular elastomeric web having an inner peripheral surface formed to sealingly engage an outer periphery of an associated spigot, said web having a centerline;

an elastomeric protrusion projecting radially outward from said web, said protrusion being bisected by said centerline and having in radial cross section a tapered stem with opposite sides symmetrical about said centerline and terminating in an enlarged toroidal rim, said protrusion deflecting to engage an inner periphery of an associated bell; and, wherein the gasket can be installed in and associated pipe joint in either direction along a longitudinal axis of the associated pipe joint.

17. The gasket of claim 16 wherein said gasket further comprises an annular bore extending in said elastomeric web, said bore being spaced from said projection and being so located on said elastomeric web that it is bisected by said centerline thereof.

18. The gasket of claim 16 wherein said protrusion comprises a mushroom-shaped member in cross section.

19. The gasket of claim 18 wherein said elastomeric web further comprises first and second lips, said lips being located on a respective side of said mushroom-shaped member.

20. The gasket of claim 16 wherein said protrusion comprises:

a pair of wings symmetrically located on a respective side of said centerline; and, a radially outwardly projecting rib which is bisected by said centerline.

21. A pipe joint which can accommodate both internal pressures and external pressures, said pipe joint comprising:

an outer pipe;

an inner pipe inserted into said outer pipe, wherein one of said outer pipe and said inner pipe comprises an annular groove; and, a gasket positioned within said annular groove and adapted to provide a seal between said outer pipe and said inner pipe, said gasket comprising:

an annular gasket body formed of a resilient material, said gasket body having a centerline and including a base adapted to sealingly engage said groove, a projection extending from said gasket body, said projection being so located on said gasket body that it is bisected by said centerline thereof, said projection comprising a first compression point for said gasket body, and an annular bore extending in said gasket body, said bore being spaced from said projection and being so located on said gasket body that it is bisected by said centerline thereof.

22. The pipe joint of claim 21 wherein said gasket further comprises:

a first recess formed in said gasket body, said first recess being located on a first side of said centerline; and, a second recess formed in said gasket body, said second recess being located on a second side of said centerline.

23. The pipe joint of claim 22 wherein said gasket body further comprises:

a third recess formed in said gasket body, said third recess being located on said first side of said centerline in a spaced manner from said first recess; and, a fourth recess formed in said gasket body, said fourth recess being located on a second side of said centerline in a spaced manner from said second recess.

* * * * *